(12) United States Patent
Szita et al.

(10) Patent No.: US 6,751,046 B1
(45) Date of Patent: Jun. 15, 2004

(54) WRITING SERVO DATA PATTERNS ON A DATA STORAGE DISK TO ACCOUNT FOR REPEATABLE AND NON-REPEATABLE DISTURBANCES AND THEREBY PROVIDE CONCENTRIC DATA TRACKS

(75) Inventors: Gabor Szita, Santa Clara, CA (US); Karl A. Belser, San Jose, CA (US)

(73) Assignee: Seagate Tech. LLC, Scotts Valley, CA (US)

( * ) Notice: Subject to any disclaimer, the term of this patent is extended or adjusted under 35 U.S.C. 154(b) by 332 days.

(21) Appl. No.: 09/695,185

(22) Filed: Oct. 23, 2000

Related U.S. Application Data
(60) Provisional application No. 60/202,888, filed on May 10, 2000, provisional application No. 60/170,240, filed on Dec. 10, 1999, provisional application No. 60/167,953, filed on Nov. 29, 1999, and provisional application No. 60/161,131, filed on Oct. 22, 1999.

(51) Int. Cl.$^7$ .............................................. G11B 5/596
(52) U.S. Cl. ................................................... 360/77.04
(58) Field of Search ............................ 360/77.04, 75

(56) References Cited

U.S. PATENT DOCUMENTS

| | | | | |
|---|---|---|---|---|
| 5,570,247 A | * | 10/1996 | Brown et al. | 360/75 |
| 5,585,976 A | * | 12/1996 | Pham | 360/77.04 |
| 5,793,559 A | * | 8/1998 | Shepherd et al. | 360/78.09 |
| 5,825,578 A | * | 10/1998 | Shrinkle et al. | 360/77.08 |
| 5,978,169 A | * | 11/1999 | Woods | 360/77.04 |
| 6,049,440 A | * | 4/2000 | Shu | 360/77.04 |
| 6,347,936 B1 | * | 2/2002 | Young et al. | 431/11 |
| 6,411,461 B1 | * | 6/2002 | Szita | 360/77.07 |
| 6,421,198 B1 | * | 7/2002 | Lamberts et al. | 360/77.04 |
| 6,437,936 B1 | * | 8/2002 | Chen et al. | 360/77.04 |
| 6,449,116 B2 | * | 9/2002 | Morris et al. | 360/77.04 |

\* cited by examiner

*Primary Examiner*—David Hudspeth
*Assistant Examiner*—K. Wong
(74) *Attorney, Agent, or Firm*—Kirk A. Cesari

(57) ABSTRACT

A method for self-servo writing begins by calibrating at least one ruler formed on at least one storage disk. A ruler is a position-sensing pattern that defines the radial position of a recording head. The calibration process determines at least one correction factor for the at least one ruler on the disk. A servo system is then activated and the correction factors are used when writing the final servo pattern. During the process of writing the final servo patterns, the correction factors are modified to account for variations in any repeatable disturbances and for errors caused by any non-repeatable disturbances.

13 Claims, 13 Drawing Sheets

WRITING SERVO DATA PATTERNS ON A DATA STORAGE DISK TO ACCOUNT FOR REPEATABLE AND NON-REPEATABLE DISTURBANCES AND THEREBY PROVIDE CONCENTRIC DATA TRACKS

CROSS-REFERENCE TO RELATED APPLICATIONS

This application is related to and claims benefit of commonly assigned U.S. Provisional Application No. 60/161,131 filed on Oct. 22, 1999 and entitled "Method For Writing Concentric Servo Tracks Based On Pre-Formed Servo Pattern", and U.S. Provisional Application No. 60/167,953, filed on Nov. 29, 1999 and entitled "Method To Insure Radial and Circumferential Alignment Of Data Tracks in Hard Disk Drives Employing Servo-Patterned Media". The subject matter of these related applications is incorporated herein by reference.

This application is related to U.S. Provisional Patent Application Serial No. 60/170,240, entitled "Virtual Tracks For Repeatable Runout (RRO) Management", filed on Dec. 10, 1999, and U.S. Provisional Patent Application Serial No. 60/202,888, entitled "Efficient Compression And Storage Of ZAP Tables", filed on May 10, 2000, to which U.S. patent application Ser. No. 09/781,363 (filed Feb. 12, 2001) for "Compression And Storage Of Written-In Error Compensation Tables In An Embedded Servo Disc Drive" was filed claiming the benefit thereof, which issued as U.S. Pat. No. 6,449,116. This application is also related to U.S. patent application Ser. No. 09/243,574, entitled "Data Collection System And Method For Zero Acceleration Path Correction", filed on Feb. 3, 1999 which issued as U.S. Pat. No. 6,411,461. All related applications are commonly assigned.

BACKGROUND

1. Field of the Invention

The present invention relates to data storage systems, and more particularly to data storage systems that store data in tracks on a storage medium. Still more particularly, the present invention relates to a method and system for writing concentric data tracks in a data storage system.

2. Description of the Prior Art

Data storage systems record and reproduce data stored on a recording medium. Conventional systems typically include one or more storage disks in the storage system. The recording medium generally takes the form of a circular storage disk having a plurality of concentric data tracks formed thereon. Magnetic and optical disks are two examples of storage disks that are used in data storage systems.

The positioning of one or more recording heads relative to the data tracks is generally accomplished by incorporating a closed-loop, electro-mechanical servo system. The implementation of the servo system may include a dedicated servo surface that is associated with one of the plurality of heads in the data storage system. Alternatively, short bursts of servo data, referred to as a servo burst field, may be written amid the contents of the user data tracks. One technique used to form the servo data on a disk is to use a servo track writer. A servo track writer writes the servo data and a control system monitors the servo surface or the servo burst field data to maintain the position of the heads relative to the concentric tracks on the disk(s). Unfortunately, as track density increases, conventional servo track writers are unable to write servo data with the necessary accuracy.

Another limitation to conventional storage systems relates to the manufacturing tolerances of the system. When the storage system is assembled, the disks are typically placed on a shaft that fits into a hole at the center of each disk. The disks are then clamped into place in order to secure each disk in a fixed plane, one above the other. Each disk will then rotate around the shaft at its corresponding center.

Unfortunately, the positioning of the disks relative to the shaft is influenced by various tolerances, including shaft and clamp tolerances. FIG. 1 depicts a data track written on a patterned storage disk. A recording disk 100 is rotated by a spindle motor mounted at the center 102 of the recording disk 100. The solid line 104 represents the ideal servo track. The dashed line 106 represents the track center after the servo track writing process. Due to various disturbances that occur during the servo track write process, as well as media imperfections, track 106 is not a concentric circle on the disk. Instead, track 106 has been written eccentric in relation to the center of the disk 100 (or to the center of balance of the disk).

Additionally, the tracks are not necessarily lined up from one disk surface to another disk surface. This is known as radial misalignment. Radial misalignment and eccentricity mean the servo system has to work harder to follow the track and to find the same track on another disk.

Furthermore, the distortion of the disk due to clamping, repeatable motor runout, and other factors may cause additional higher harmonic disturbances. FIG. 2 illustrates a portion of a data track written on a recording disk. Data track 200 is comprised of an ideal track center 202 and an actual track center 204 as written by the writer. The width of the data track is approximately five micro-inches. Consequently, when the recording head attempts to follow the actual track center, additional higher harmonic disturbances are created. The variations in the actual track center occur over such as small distance (the track width) and can change directions so quickly, that the head has trouble following the actual track center. And in doing so, it creates additional higher harmonic disturbances in the storage system.

SUMMARY

The present invention overcome the limitation of the prior art by providing a method and system for writing concentric data tracks in a data storage system. The method provides for self servo writing by first calibrating a ruler on a disk surface. Correction factors to correct for the eccentricity are determined. The final servo patterns are then written and the correction factors are modified to account for any variation in the repectable disturbances and for errors caused by any non-repeatable disturbances.

To begin the process a ruler is calibrated. A servo system is then activated and the application of the correction factors determined in the previous step. The servo system is now running on corrected circular tracks because the correction factors are being applied. Next, an A burst is written and the correction factors are adapted to account for repeatable disturbances that vary at various points on the disk surface. The recording head is then moved forward by $x_r/4$, and the C burst is written and the correction factors are adapted. The recording head is moved forward by $x_r/4$, and the B burst is written and the correction factors are adapted. Again, the recording head is moved forward by $x_r/4$, and the D burst is written and the correction factors are adapted.

After the final servo patterns are then written and the correction factors are modified for any variations in the repeatable disturbances, the drive level ZAP correction factors are determined when the magnitude of the signal read from the A and B bursts is equal. Typically, moving the head back by $x_r/2$ locates a position where A=B. Next, the drive level ZAP correction factors for C=D are determined (move head forward by $x_r/4$). The ZAP correction factors are then stored on the disk, typically in the dedicated fields in the servo sectors. During normal operation of the storage system, the ZAP correction factors are read as part of the drive level servo sectors and subtracted from the measured position. Once the drive level ZAP correction factors are determined and stored on the disk, the head is moved to the next track (move forward $x_r/2$), the process repeats until all of the tracks have been completed.

BRIEF DESCRIPTION OF THE DRAWINGS

The novel features believed characteristic of the invention are set forth in the appended claims. The invention itself, however, as well as a preferred mode of use, and further objects and advantages thereof, will best be understood by reference to the following detailed description of an illustrative embodiment when read in conjunction with the accompanying drawings, wherein:

DETAILED DESCRIPTION

The present invention relates to a method and system writing concentric data tracks in a data storage system. The following description is presented to enable one of ordinary skill in the art to make and use the invention and is provided in the context of a specific embodiment, namely a hard disk drive system. However, the present invention is not limited to this embodiment. Various modifications to the specific embodiments will be readily apparent to those skilled in the art and the generic principles herein may be applied to other implementations. Thus, the present invention is not intended to be limited to the embodiment shown but is to be accorded the widest scope consistent with the appended claims and with the principles and features described herein.

Figure 1:
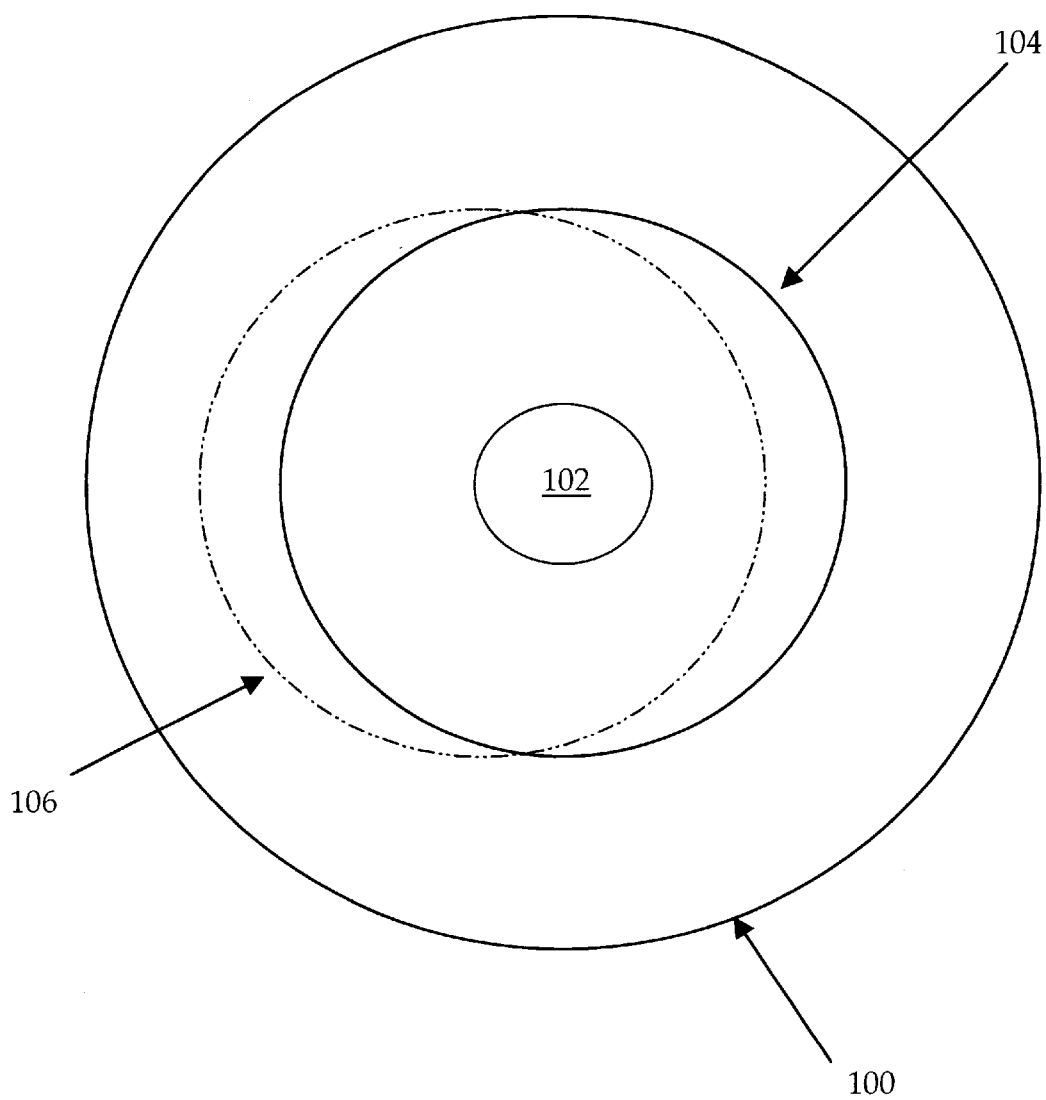
FIG. 1 depicts a data track written on a patterned storage disk.
Figure 2:
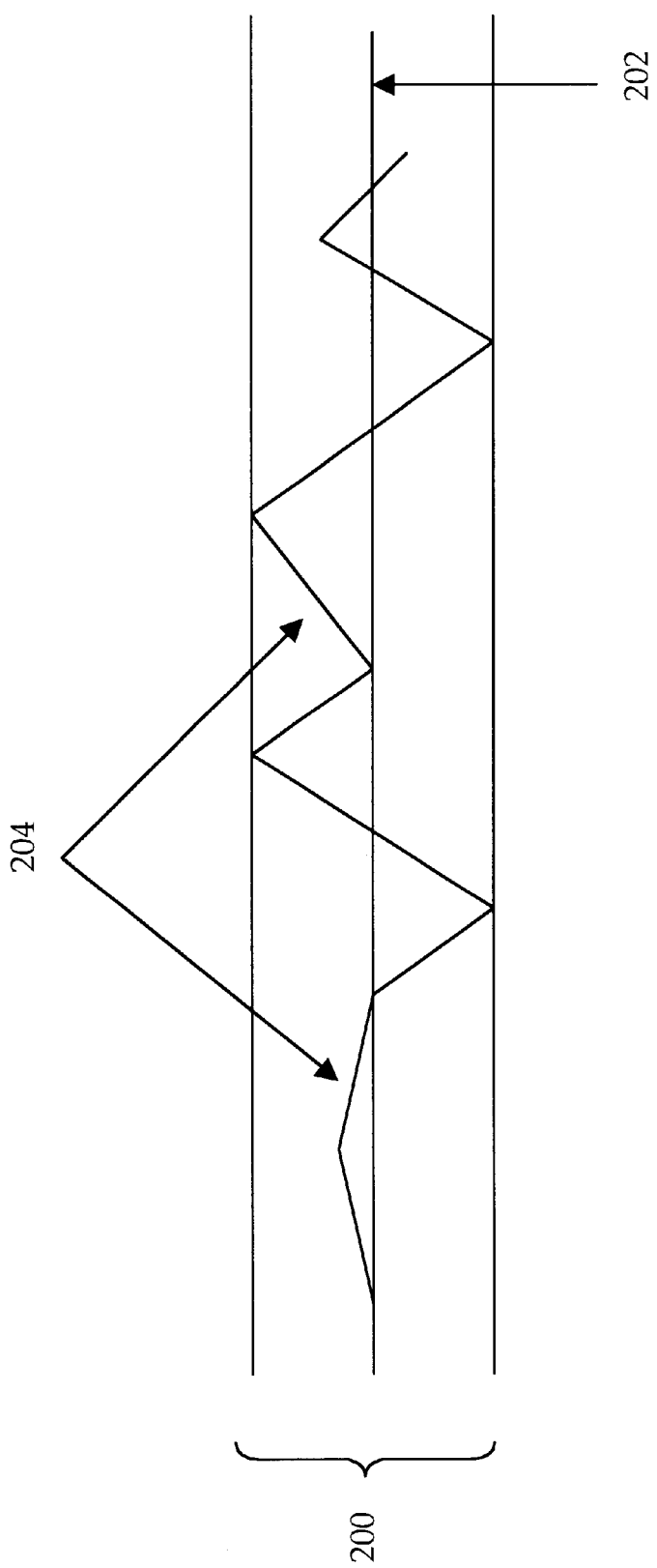
FIG. 2 illustrates a portion of a data track written on a recording disk.
Figure 3:
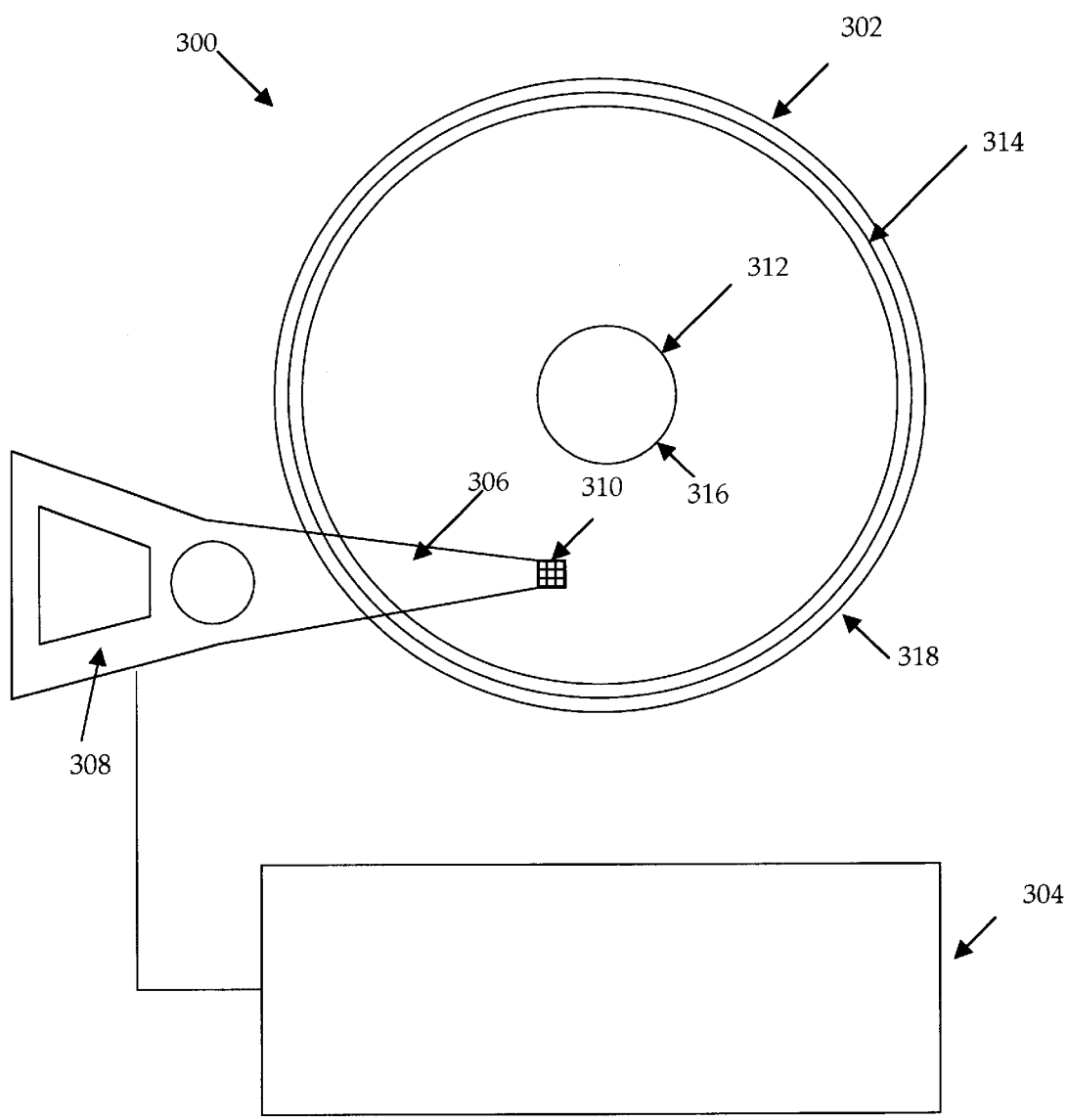
FIG. 3 depicts a data storage system that can be used with the present invention.

FIG. 3 depicts a data storage system that can be used with the present invention. Data storage system 300 in this exemplary embodiment is a hard disk drive system. Data storage system 300 includes one or more recording disks 302, a storage system controller 304, an actuator 306, a voice coil motor 308, a recording head 310, and a rotating spindle 312. The recording head 310 is positioned at the end of actuator 306 which is moved via voice coil motor 308, and transfers data between storage system controller 304 and a specific physical location on recording disk 302. Data is preferably stored in many approximately consecutively numbered concentric rings or "tracks" 314 on recording disk 302. For clarity, only two tracks 314 are shown in FIG. 3. The tracks are displaced radially from each other, beginning at the inner diameter 316 of the disk 302 and continuing to the outer diameter 318 of the disk 302.

Storage system controller 304 may randomly access a specific logical location on recording disk 302 via a particular track address and a particular sector address. Tracks 314 are very closely spaced in order to maximize storage capacity and economy. The mechanical precision of the movement of recording disk 302 and the movement of recording head 310 is critical to accessing the proper data storage location on recording disk 302. Storage system controller 304 thus requires some means for precisely positioning recording head 310 quickly and accurately over tracks 314 for subsequent storage and retrieval operations.

Figure 4:
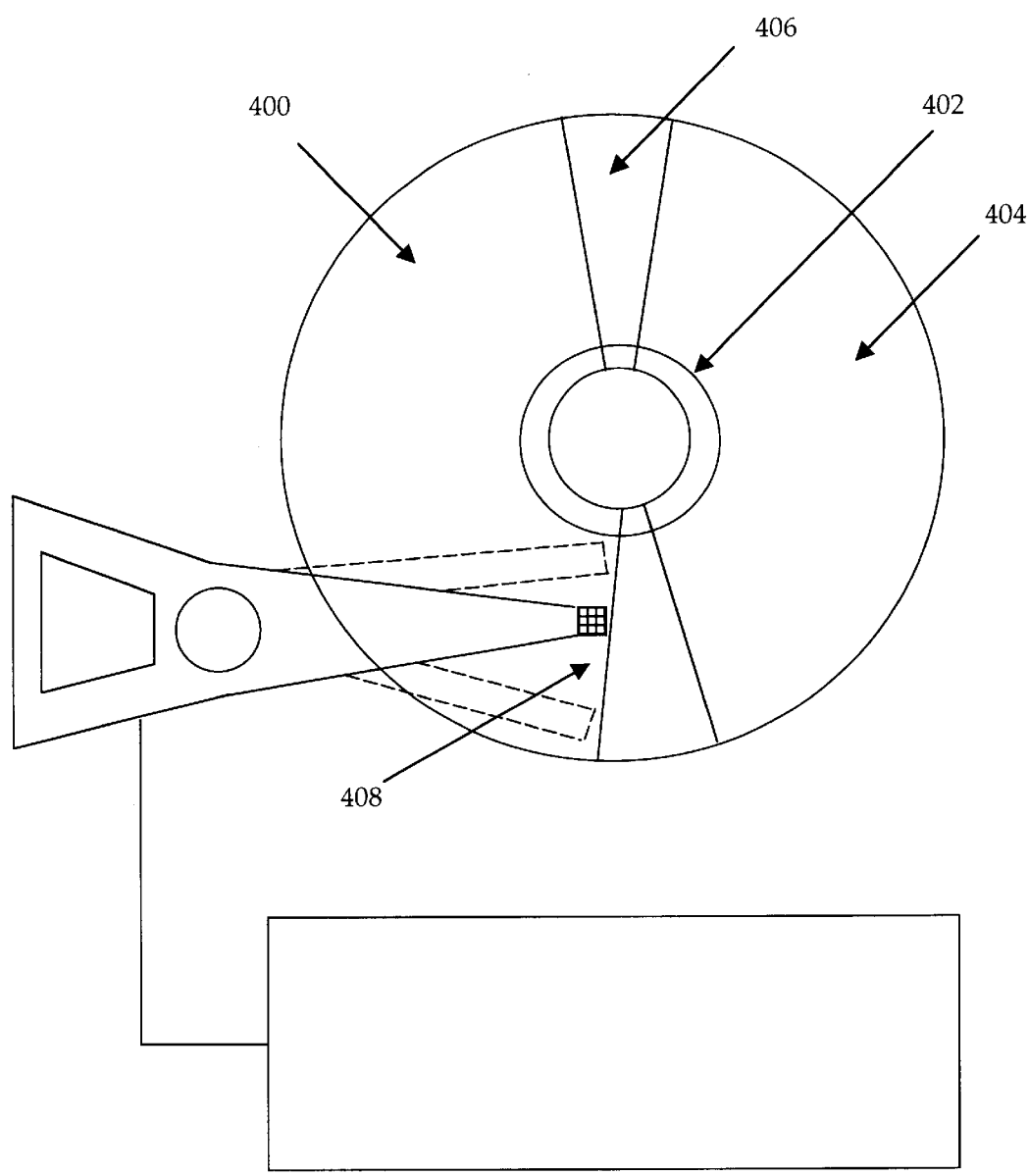
FIG. 4 illustrates a diagram of a surface of an exemplary recording disk.
Figure 5:
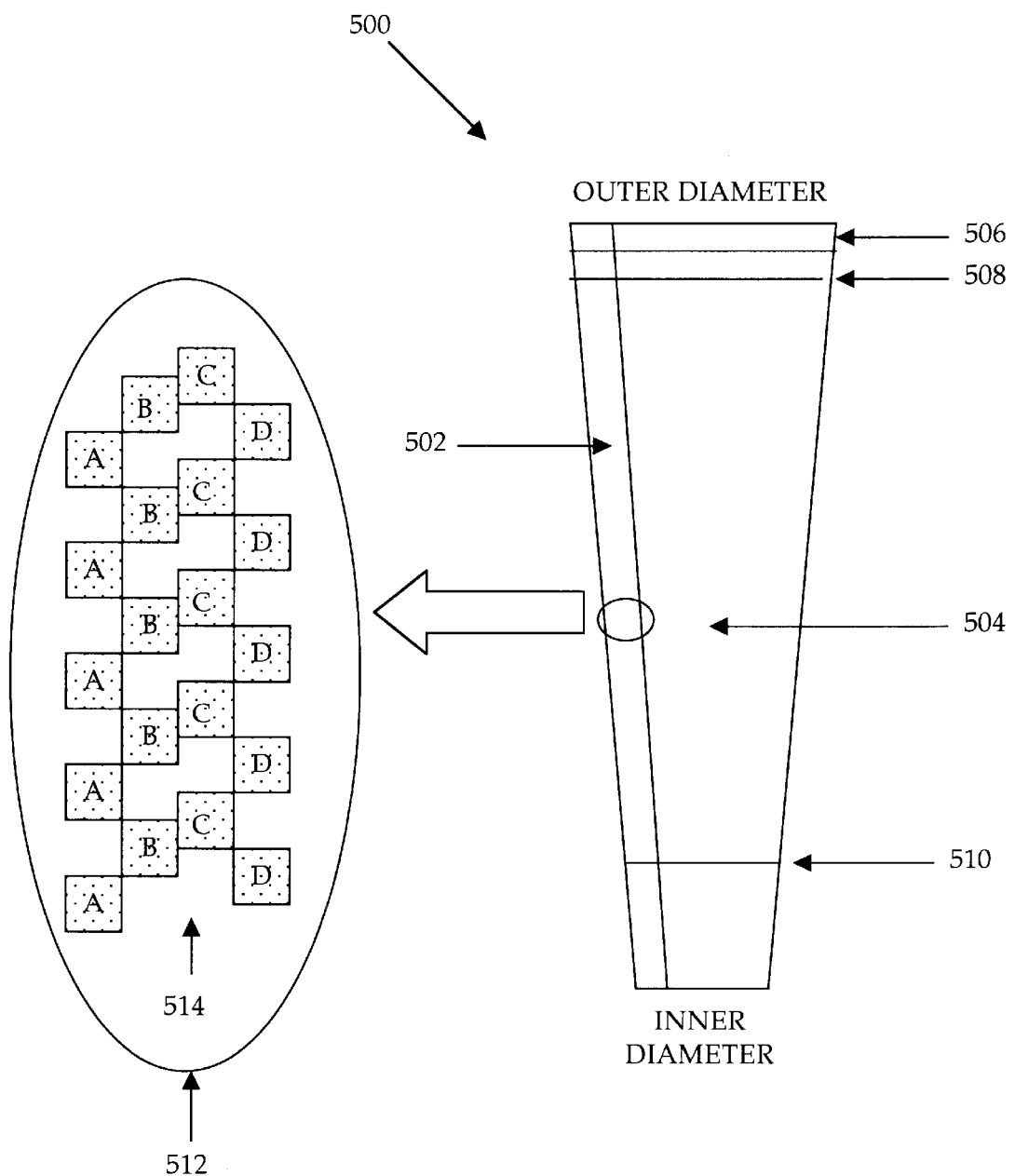
FIG. 5 depicts a linearized diagram of an exemplary sector illustrated in FIG. 4.

Referring now to FIG. 4, a diagram of a surface of an exemplary recording disk is illustrated. The surface 400 of recording disk 302 typically includes a landing zone 402, a useable data zone 404, arc-shaped sectors 406, and an arc shaped path 408 taken across the surface 400 by recording head 310. A linearized diagram of an exemplary sector 406 is shown in FIG. 5. Sector 500 includes a servo sector 502, a data wedge 504, a pair of neighboring numbered concentric tracks 506 and 508, and a border 510 between landing zone 402 and useable data zone 404. Data wedge 504 includes stored user data, while servo sector 502 includes address and alignment information used by the disk drive system.

A portion of servo sector 502 is enlarged in window 512. A plurality of servo burst fields 514 are written magnetically in servo sector 502. In this exemplary embodiment, the plurality of servo burst fields 514 are written as a quadrature pattern comprised of an A burst, a B burst, a C burst and a D burst. The present invention is not limited to a quadrature pattern, however. Other servo burst fields, including amplitude patterns(e.g. null pattern, split burst pattern) and phase patterns, can be used with the present invention.

As can be seen, the ABCD pattern repeats across the servo sector. The plurality of servo burst fields 514 form "rulers" in the exemplary embodiment. A ruler is a position-sensing pattern that defines the radial position of a recording head. The rulers can be comprised of a simple guide pattern that is erased after the calibration process is complete, or the rulers can be the final servo burst pattern (or a portion thereof). Additionally, the rulers can be patterned onto the disk before the disk is assembled into the storage system.

Since the servo burst fields 514 comprise a quad pattern, one set of four bursts is used in each ruler. In other words, an A burst, B burst, C burst, and D burst are included in each ruler. The four burst pattern can be grouped such that the individual bursts are organized in any order. It should be noted that the present invention is not limited to this type of ruler. Other servo burst fields, including amplitude patterns (e.g. null pattern, split burst pattern) and phase patterns, can be used with the present invention. Additionally, other elements of a servo sector can be used when defining a ruler.

Figure 6:
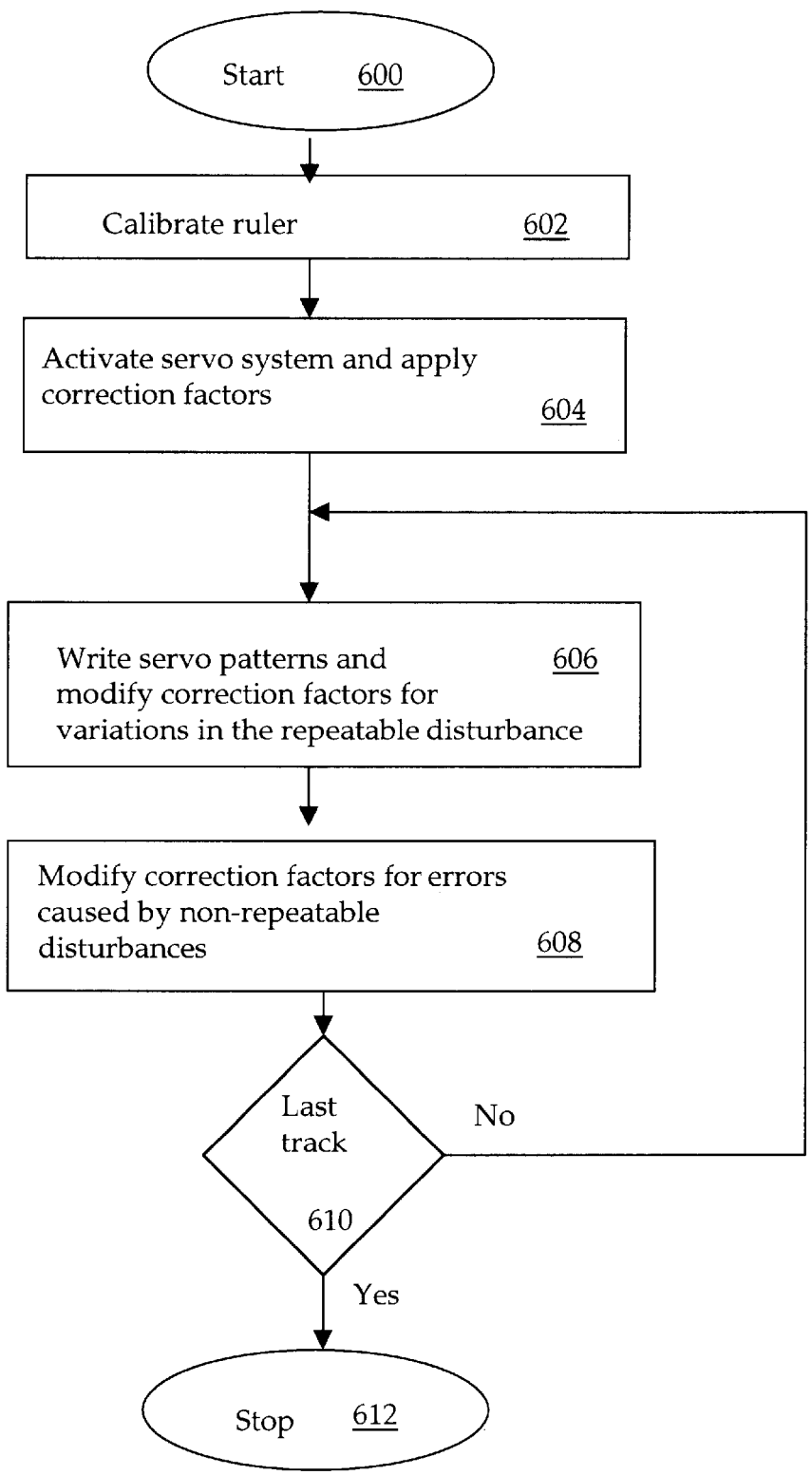
FIG. 6 is a flowchart illustrating a method for self-servo writing according to the present invention.

Referring to FIG. 6, a flowchart illustrating a method for self servo writing according to the present invention is shown. The process begins at block 600 and thereafter passes to block 602, where a ruler is calibrated. The method continues at block 604 with the activation of the servo system and application of the correction factors determined in the previous step. The final servo patterns are then written and the correction factors are modified for any variations in the repeatable disturbances (block 606). The correction factors are modified a second time at block 608 to account for errors caused by any non-repeatable disturbances in the storage system. A decision is then made as to whether or not the last track has been reached, as shown in block 610. If the last track has not been reached, the process returns to block 606 and repeats until the last track is reached. When the last track is reached, the method ends as shown in block 612.

Figure 7:
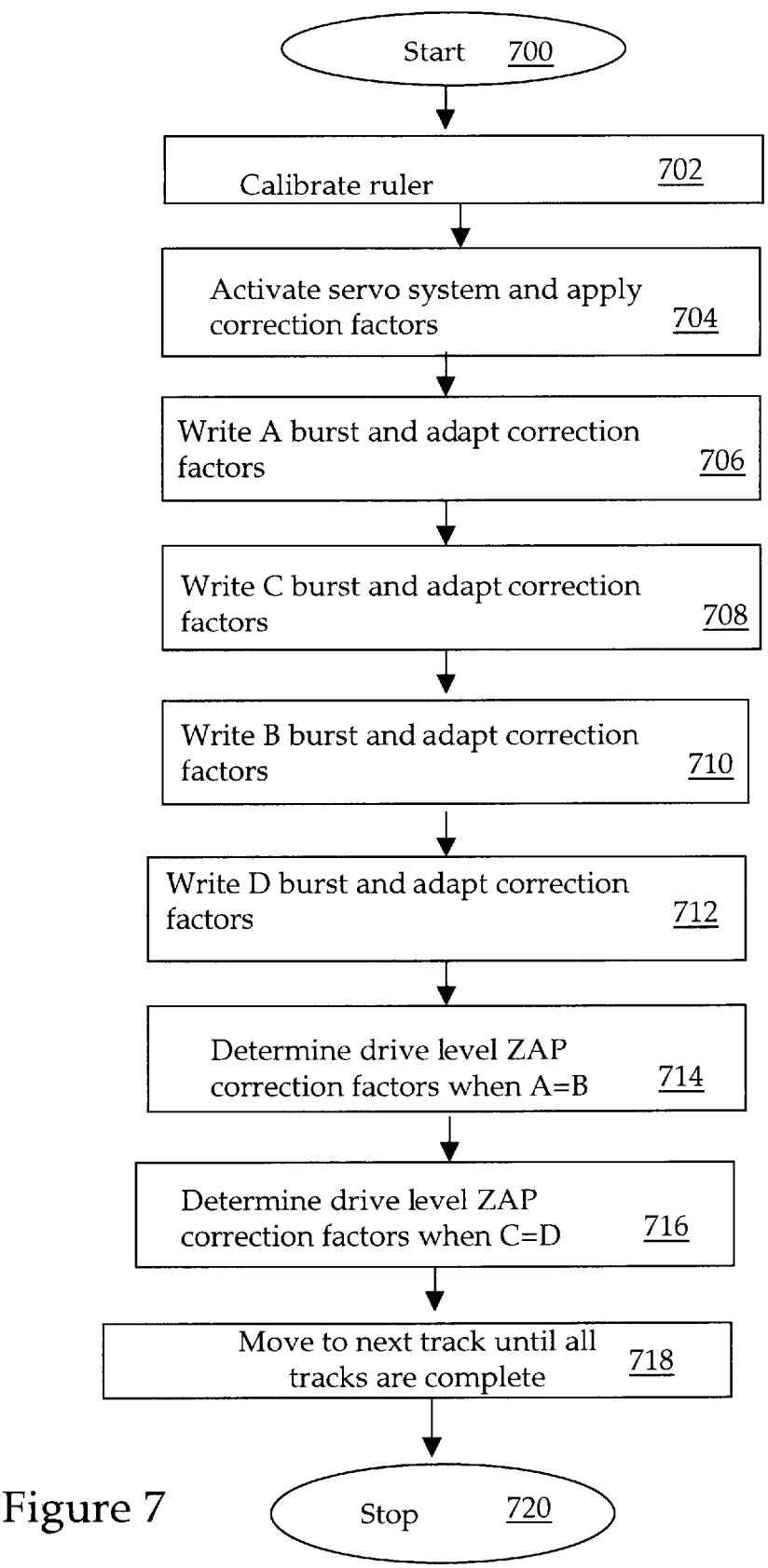
FIG. 7 is a flowchart illustrating a method for self-servo writing according to the present invention.

FIG. 7 is a flowchart illustrating a method for self-servo writing according to the present invention. FIG. 7 depicts blocks 606 and 608 in more detail. The process begins at block 700 and thereafter passes to block 702, where a ruler is calibrated. The method continues at block 704 with the activation of the servo system and application of the correction factors determined in the previous step. The servo system is running on corrected circular tracks because the correction factors are being applied. Next, the A burst is written and the correction factors are adapted to account for repeatable disturbances that vary at various points on the disk surface (block 706). The recording head is then moved forward by $x_r/4$ (see FIG. 9 for $x_r$), and the C burst is written and the correction factors are adapted. The recording head is moved forward by $x_r/4$, and the B burst is written and the correction factors are adapted. Again, the recording head is moved forward by $x_r/4$, and the D burst is written and the correction factors are adapted (blocks 708, 710, 712). After the final servo patterns are then written and the correction factors are modified for any variations in the repeatable disturbances, the drive level ZAP correction factors are determined when the magnitude of the signal read from the A and B bursts is equal (block 714). Typically, moving the head back by $x_r/2$ locates a position where A=B. Next, block 716 depicts the step of determining the drive level ZAP correction factors for C=D (move head forward by $x_r/4$). The ZAP correction factors are then stored on the disk, typically in the dedicated fields in the servo sectors. During normal operation of the storage system, the ZAP correction factors are read as part of the drive level servo sectors and subtracted from the measured position. Once the drive level ZAP correction factors are determined and stored on the disk, the head is moved to the next track (move forward $x_r/2$), and the steps shown in blocks 704 through 716 are repeated until all of the tracks have been completed. Finally, the process ends, as shown in block 720.

Figure 8:
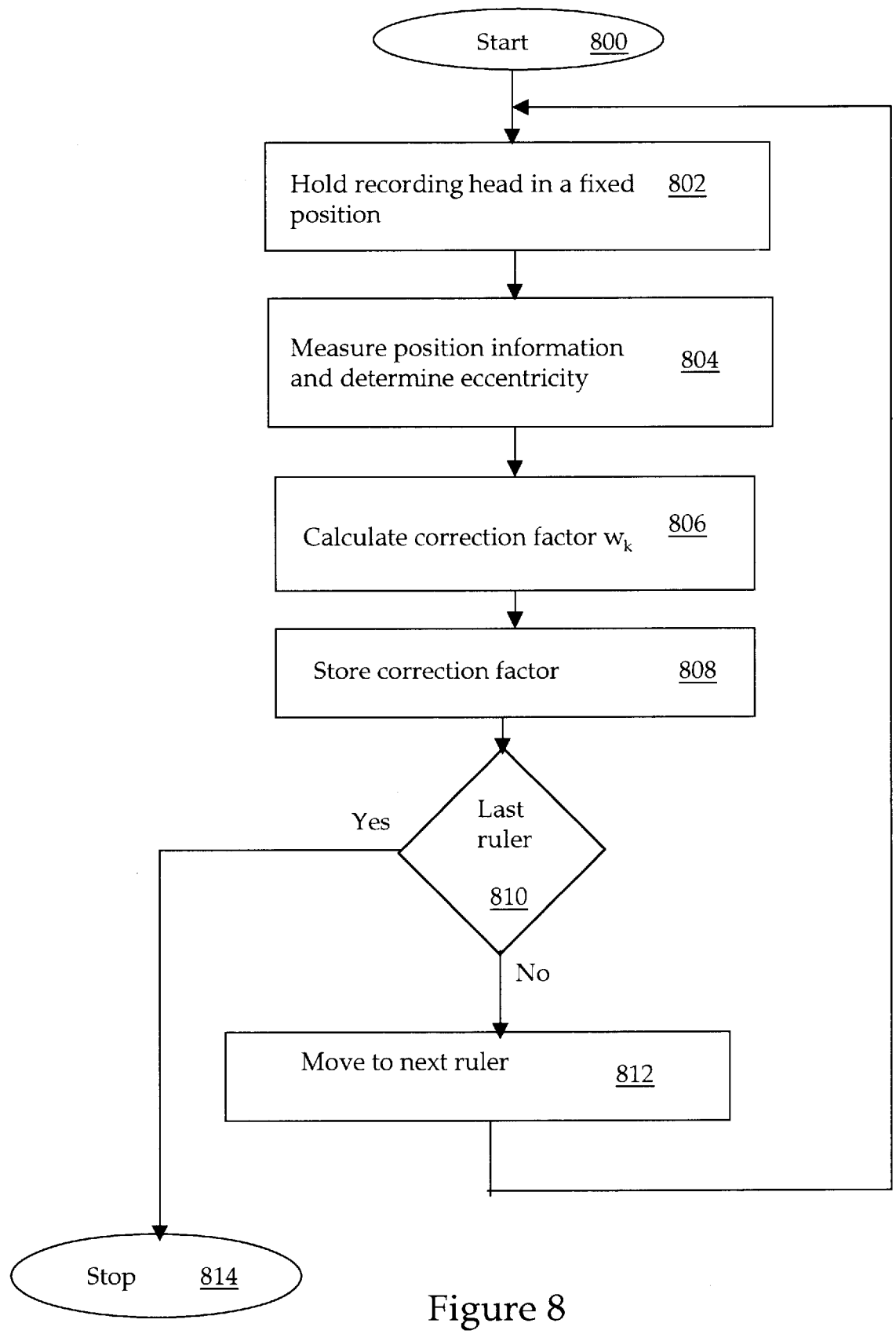
FIG. 8 is a flowchart illustrating an exemplary method for calibrating a ruler.

Referring to FIG. 8, a flowchart illustrates an exemplary method for calibrating a ruler. The process begins at block 800 and thereafter passes to block 802 where a recording head is held in a fixed position. In one embodiment of the invention, the recording head is held in a fixed position by moving the actuator to the inner diameter of a disk until it rests against the crash stop. A sufficient current is applied to the voice coil motor to hold the actuator firmly against the crash stop. In an alternative embodiment, the recording head is held in a fixed position by moving the actuator to the outer diameter and holding it against that crash stop. In yet another embodiment, the recording head is held at both the inner and outer diameters by keeping the actuator firmly against the respective crash stop. The calibration process is performed at both locations. In this way, the calibration data for both positions can be interpolated between the two as the head moves from the inner diameter to the outer diameter.

The position information is then determined by reading the magnitude of the signal generated by the ABCD bursts at each ruler (block 804). Next, the correction factor $w_k$ is determined (block 806). The correction factor is then saved, as shown in block 808. In this exemplary embodiment, the correction factor is stored in a correction table in a memory, such as flash memory. Typically, one correction factor should be determined for each ruler. Thus, the number of correction factors equals the number of rulers on the disk. In this exemplary embodiment, the rulers are numbered from 0 to n. Ruler 0 is typically defined as the first ruler detected after a once per revolution index signal is obtained from the spindle motor.

In this exemplary embodiment, the correction table is synchronously averaged by reading the position information for several revolutions of the recording disk. Rotating the disk for several revolutions allows the noise generated by non-repeatable disturbances to be averaged over time and can therefore minimize the effects of the noise from non-repeatable disturbances. Disk flutter, spindle vibration, and bearing imperfections are examples of non-repeatable disturbances. After a large number of averages the content of the correction table W will be approximately equal to the repeatable portion of the disturbance, $d_r$, i.e.

$$W = \frac{1}{r}\sum_{i=1}^{r} d_i \approx d_r$$

where the subscript i denotes disk revolutions, and r is the total number of disk revolutions used in the averaging process.

Referring to block 810, a decision is made as to whether or not there are any remaining rulers on the disk. If so, the process continues at block 812 by moving to the next ruler and returning to block 802. This process continues until a correction factor has been determined for all of the rulers on the surface of a disk, at which point the process ends (block 814).

Figure 9:
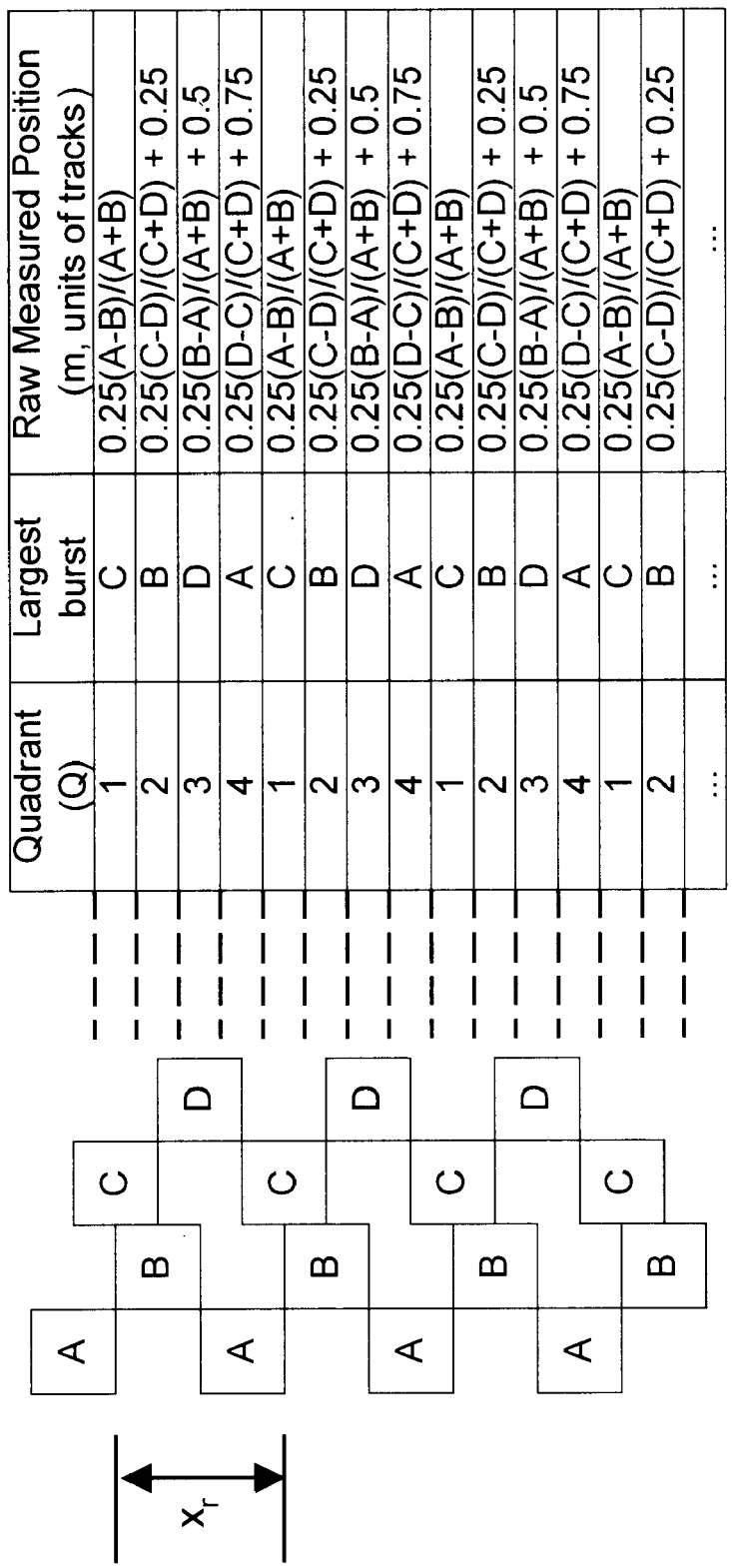
FIG. 9 illustrates a ruler subdivided into four quadrants according to the present invention.

FIG. 9 illustrates each ruler subdivided into four quadrants. When the head moves from quadrant 4 to quadrant 1 the measured position information returns to an initial value defined by the equation 0.25(A−B)/(A+B). Thus, the number of times a head travels over a boundary must be taken into account when accurately determining the position of the head because the measured position may include a "wrap over" value. The wrap over value is created by the, repeating ABCD bursts as the head moves radially across the disk. As can been seen, as the head moves across a ruler boundary (e.g., from quadrant 1 to quadrant 4), the measured position information returns to the initial value. Therefore, the position information needs to be unwrapped by adding one when the head moves from quadrant 4 to quadrant 1, or by subtracting one when the head moves from quadrant 1 to quadrant 4.

Figure 10:
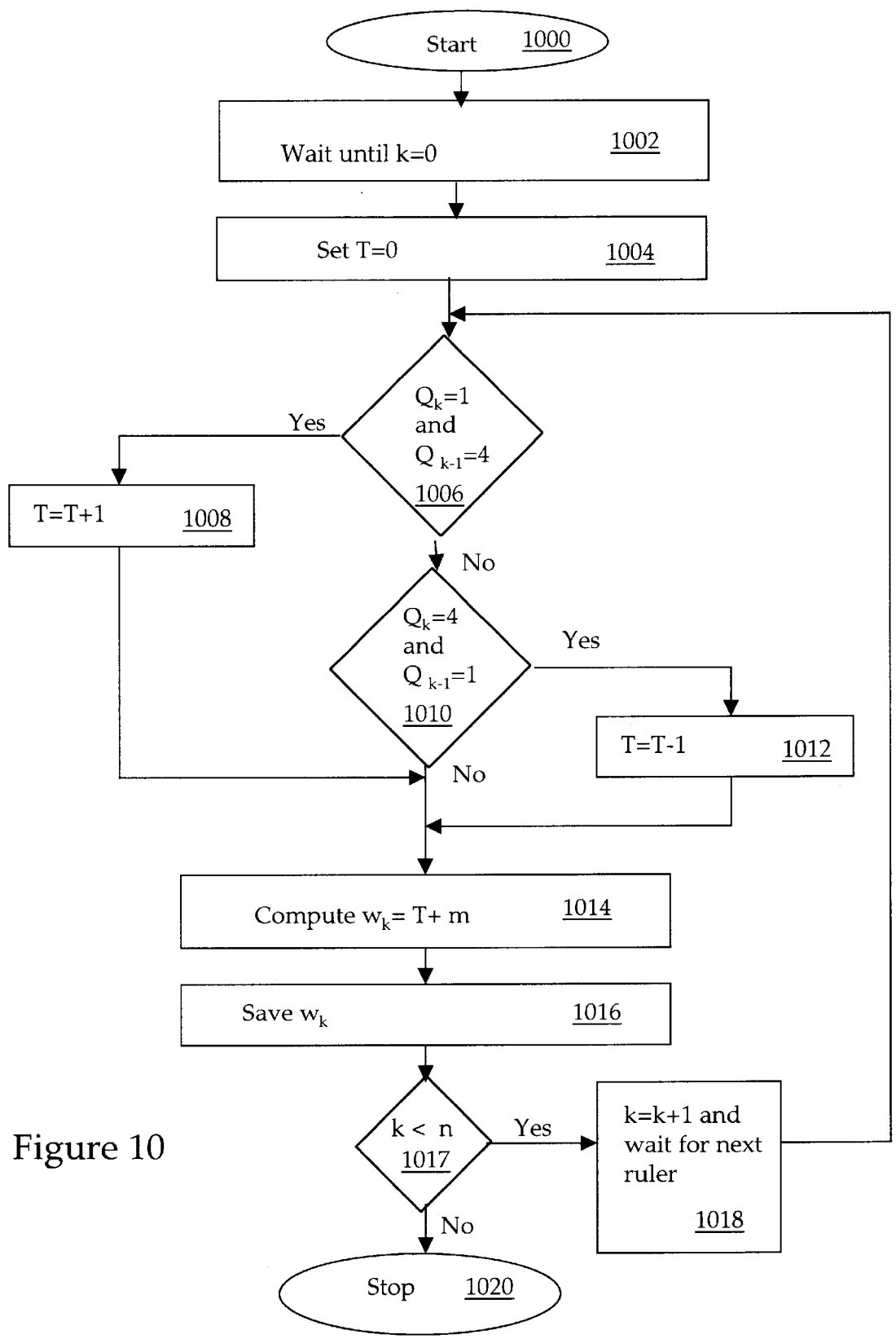
FIG. 10 is a flowchart illustrating an exemplary method for calculating a correction factor as shown in block 806 in FIG. 8.

FIG. 10 is a flowchart illustrating an exemplary method for calculating a correction factor as shown in block 806 in FIG. 8. The variable k denotes the ruler number and $Q_k$ denotes the quadrant at the kth ruler. The variable T denotes the number of wrap-overs from quadrant 4 to 1 minus the number of wrap-overs from quadrant 1 to 4.

The process begins at block 1000 and thereafter passes to block 1002, where the system waits until the ruler number equals zero, and then sets T equal to zero (block 1004). If $Q_k$ equals 1 and $Q_{k-1}$ equals four, then T=T+1, as shown in blocks 1006 and 1008. If however, If $Q_k$ equals 4 and $Q_{k-1}$ equals 1, then T=T−1 (blocks 1010 and 1012). The correction factor $w_k$ is then computed at block 1014 by adding T to the measured position information $m_k$. The correction factor $w_k$ is stored, as shown in block 1016. If the ruler number (k) is less than the number of rulers (n), then the variable k is incremented and the system waits for the next ruler (blocks 1017 and 1018). The process then returns to:block 1004 and repeats until k=n. When k equals n, the process ends at block 1020.

Figure 11:
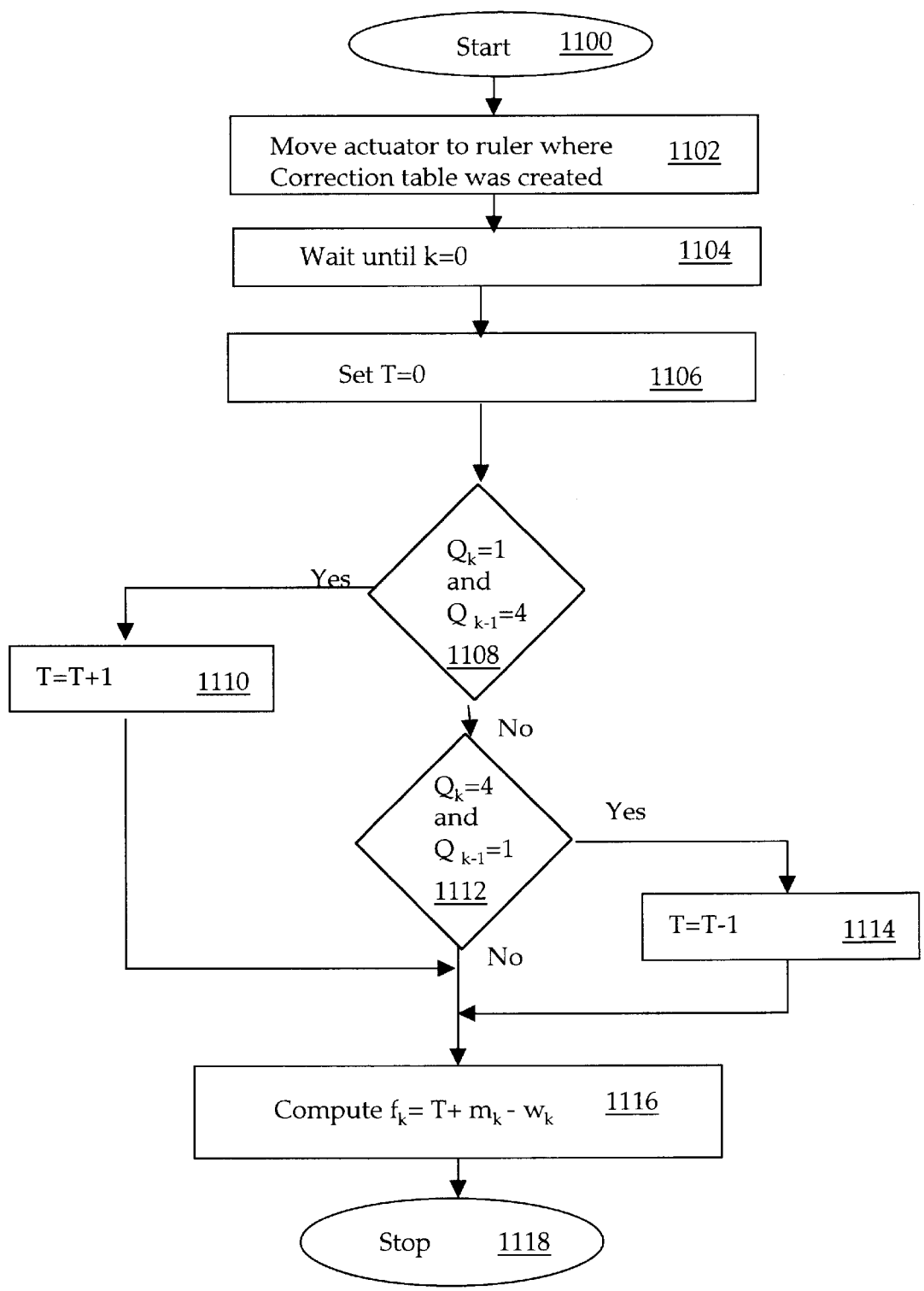
FIG. 11 is a flowchart illustrating an exemplary method for activating a servo system according to the present invention.

FIG. 11 is a flowchart illustrating an exemplary method for activating a servo system according to the present invention. Once the correction table W is determined, the closed loop servo system can be activated, and the actuator can be moved to arbitrary points on the disk to write the final servo information. The process begins at block 1100, and thereafter passes to block 1102, where the recording head is moved to the position where the correction factors in the correction table were created. In the exemplary embodiment, this means the actuator is held against the crash stop where the correction table was created. The system then waits until the ruler number (k) equals zero (block 1104). When the ruler number equals zero, the system waits until the track number (T) equals zero (block 1106).

As before, the variable $Q_k$ denotes the quadrant at the $k^{th}$ ruler. The variable T denotes the number of wrap-overs from quadrant 4 to 1 minus the number of wrap-overs from quadrant 1 to 4. If $Q_k$ equals 1 and $Q_{k-1}$ equals four, then T=T+1, as shown in blocks 1108 and 1110. If however, If $Q_k$ equals 4 and $Q_{k-1}$ equals 1, then T=T−1 (blocks 1112 and 1114). The process continues at block 1116 where, at the $k^{th}$ ruler, a position feedback signal is determined using the following equation: $f_k = T + m_k - w_k$. The process the ends, as shown in block 1118.

Figure 12:
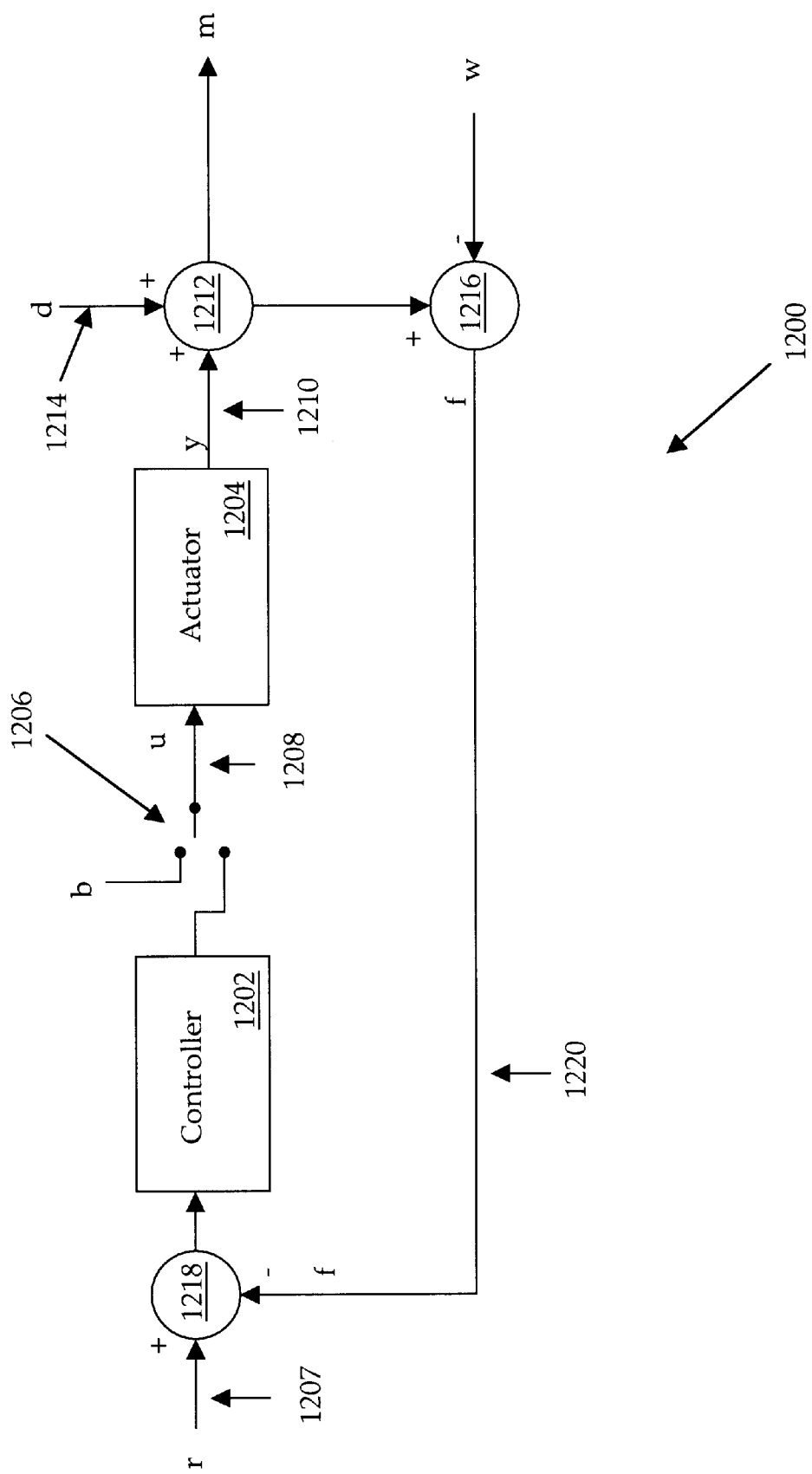
FIG. 12 is a block diagram depicting an exemplary servo system for a data storage system according to the present invention.

Referring to FIG. 12, a block diagram depicts an exemplary servo system for a data storage system according to the present invention. The servo system 1200 includes a controller 1202 and an actuator 1204. Controller 1202 is typically a microprocessor. A switch 1206 is turned to the upper position when the method described with reference to FIG. 11 begins. This disconnects the input to the actuator 1204 from the controller 1202. The process shown in FIG. 11 is performed, and when completed the switch 1206 is turned to the lower position.

The current position of the recording head (r) is input into the controller via signal line 1207. The controller 1202 then generates a signal u, typically a current signal, on line 1208. Signal u causes the actuator to move, and a position for the head (y) is output on line 1210. Repeatable disturbances and non-repeatable disturbances generate noise and this noise signal (d) is input into a first summing block 1212 via line 1214. The measured position from the servo information (m) is the sum off the position signal y and the noise signal d.

The signal m is input into second summing block 1216 along with a correction factor w. The correction factor w is subtracted from the signal m and fed back to a third block 1218 via line 1220. At block 1218 the feedback signal f is subtracted from the current position signal r and input into controller 1202. As discussed earlier, position feedback signal is determined using the, following equation: $f_k = T + m_k - w_k$. And since $W \approx d_r$, the feedback position signal cancels the noise generated by repeatable disturbances. This causes the head to move on a near perfectly circular path.

Figure 13:
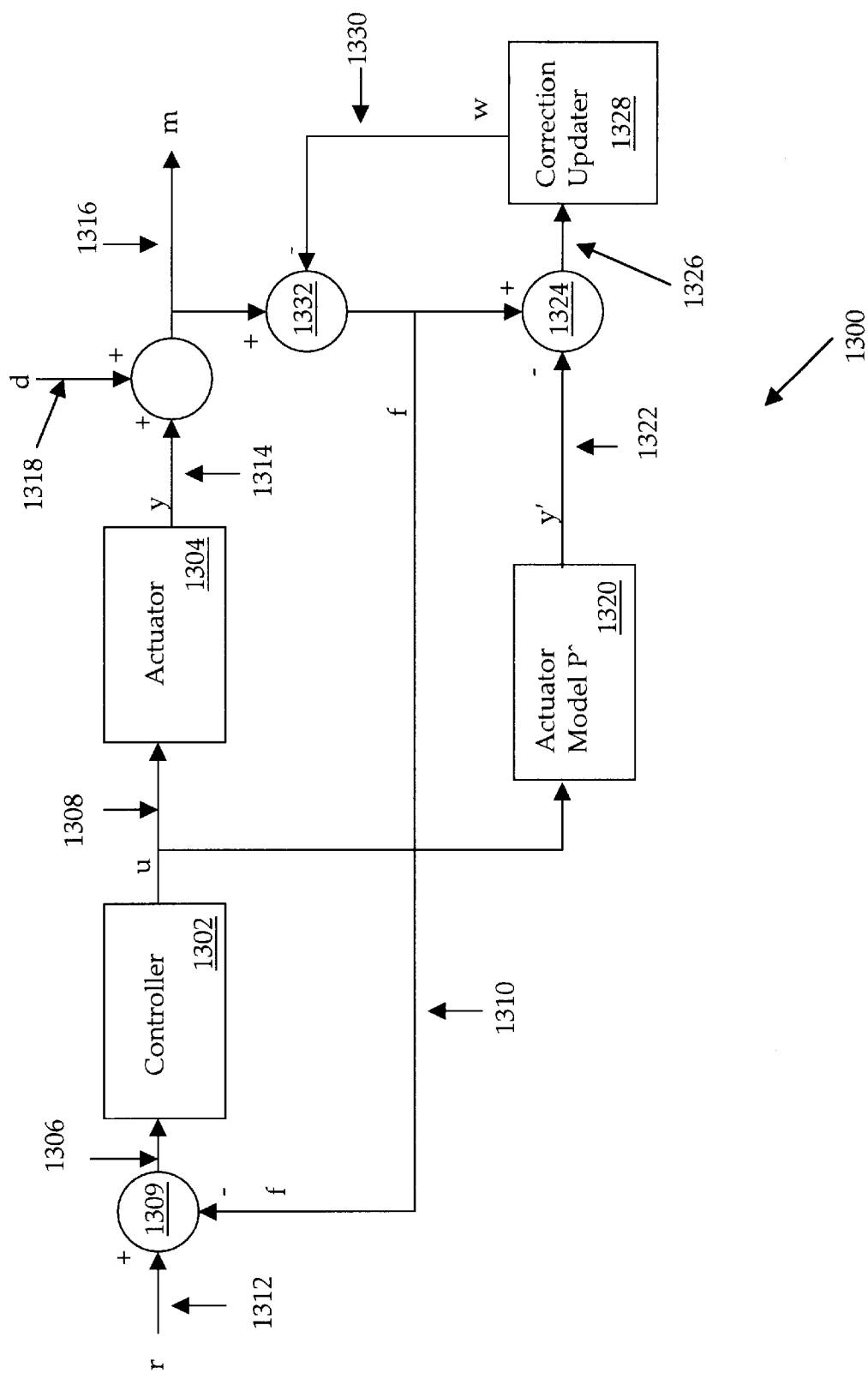
FIG. 13 is a block diagram depicting another exemplary servo system for a data storage system according to the present invention.

FIG. 13 is a block diagram depicting another exemplary servo system for a data storage system according to the present invention. A method for determining the ZAP correction factors will now be described in more detail.

Correction of Errors Due to Repeatable Disturbances

The servo system 1300 includes a controller 1302 and an actuator 1304. The controller 1302 includes an input, position error signal (PES) 1306, and an output, actuator current signal u 1308. Position error signal 1306 is the difference (see block 1309) of the position feedback signal f on line 1310 and a set point signal 1312.

The actuator current signal u on line 1308 is fed to the actuator 1304 and is used to position a head (not shown) over a disk or servo surface. Actuator 1304 provides an actuator output signal y on line 1314 that is indicative of the position of the head. The measured actuator position signal m on line 1316 is the sum of the actuator output signal y and any noise signal d on line 1318. The position disturbance signal d has repeatable ($d_r$) and non-repeatable ($d_n$) components, where $d = d_r + d_n$.

Actuator current signal u on line 1308 is also fed into an actuator model 1320. The output of the actuator model is the estimated position of the actuator. Where the modeling error is small, the output of actuator model 1320 (estimated position signal y' on line 1322), is approximately equal to actuator output signal y on line 1314. The estimated position signal y' is subtracted from the position feedback signal f at block 1324 to produce the raw estimated disturbance signal v on line 1326, which is provided as an input into a correction updater 1328. Signal v is multiplied by adaptation gain a and added to the correction table via the equation W=W+(v/a). In this way, the correction table W is continuously modified, and follows the variation of the repeatable disturbance $d_r$.

The choice of the magnitude for adaptation gain a depends on two factors in the exemplary embodiment: the ratio of the repeatable and non-repeatable disturbance, and how fast the repeatable disturbances change. If the magnitude of a is relatively large, then faster adaptation to changes in the repeatable disturbance $d_r$ will result. But accuracy may be adversely affected due to the limited elimination of non-repeatable disturbances. On the other hand, choosing a relatively small magnitude for a will reduce the influence of non-repeatable disturbances, but the adaptation to changes in $d_r$ will be slower. In the exemplary embodiment, the track to track variation of the repeatable disturbance due to disk distortion, bearing imperfections, and vibration is small, a magnitude of a between 0.001 and 0.1 works well in most typical storage systems.

A correction factor w on line 1330 is subtracted from the measured actuator position signal m by block 1332, resulting in the position feedback signal f on line 1310. The correction factor w represents the correction factors that are subtracted from the position measurement signal at each servo sample. The goal is to determine w such that it will cancel $d_r$, i.e.: $w = d_r$.

The correction updater 1328 includes the computations for calculating correction factors w. An estimated disturbance signal $w_n$ is produced on line 1330 in accordance with the formula:

$$w_n = w_{n-1} + \frac{v_{n-1}}{n}$$

The subscript n denotes the number of complete revolutions of the disk since the beginning of the data collection procedure. Let $\hat{P}(z)$ denote the open loop transfer function of the actuator 1204, and P' denote the mathematical model of the actuator implemented by actuator model 1320. In the beginning of the data collection procedure n=0 and w=0. The modeling error $P_d$ may be described by:

$$\hat{P}(z)=P(z)+P_d(z)$$

After the first revolution the estimated correction factor $w_1$ is:

$$w_1=v_0=m_0-\hat{y}_0 \cup d_0$$

Note that the numbers in the subscripts represent the number of complete revolutions of the disk since the beginning of the data collection procedure. After the second revolution:

$$w_2 = w_1 + \frac{v_1}{2} \cup w_1 + \frac{d_1-w_1}{2} = \frac{w_1+d_1}{2} \cup \frac{d_0+d_1}{2}$$

After the third revolution:

$$w_3 = w_2 + \frac{v_2}{3} \cup w_2 + \frac{d_2-w_2}{3} = \frac{2w_2+d_2}{3} \cup \frac{d_0+d_1+d_2}{3}$$

After the fourth revolution:

$$w_4 = w_3 + \frac{v_3}{4} \cup w_3 + \frac{d_3-w_3}{4} = \frac{3w_3+d_3}{4} \cup \frac{d_0+d_1+d_2+d_3}{4}$$

After n revolutions, the correction factor $w_n$ can be described by:

$$W = \frac{1}{n}\sum_{i=1}^{r} d_i$$

After, many revolutions w will cancel the repeatable disturbance $d_r$, because $$\lim_{n \to \infty} w_n = d_r$$

In addition to reducing the error caused by the non-repeatable disturbances, the error estimating technique described above also reduces the error caused by the modeling inaccuracies, $P_d(z)$, after each revolution.

The convergence of the algorithm (i.e. the number of revolutions needed to achieve sufficient accuracy when evaluating EQ. 1) is highly dependent on the accuracy of the Plant Model, $\hat{P}(s)$. A simple double integrator where $\hat{P}(s)=K/s^2$, and where K is a constant, will yield poor convergence because the model does not account for the transient properties of actuator 1304. A possible approach to overcome this problem is to measure the frequency response of actuator 1304 and use a system identification technique to derive an approximate transfer function. However, this approach requires expensive instrumentation to measure the frequency response and may result in high order transfer functions.

To overcome this problem, the frequency response of the actuator 1304 is measured and a system identification technique to derive an approximate transfer function is used. Consider again the block diagram shown in FIG. 12. Set r=0, and average the actuator current signal u (on line 1208) and the measured actuator position m over several disk revolutions. Note that the averaging process has to be synchronized to the disk rotation so that the resulting signal will contain only repeatable components. The result of the averaging process may be described by:

$$u_a(z) = \frac{1}{n}\sum_{i=1}^{n} \frac{-C(z)d_i(z)}{P(z)C(z)+1} \cup -\frac{C(z)d_r(z)}{P(z)C(z)+1}$$

$$m_a(z) = \frac{1}{n}\sum_{i=1}^{n} \frac{d_i(z)}{P(z)C(z)+1} \cup \frac{d_r(z)}{P(z)C(z)+1}$$

Next, a pulse is applied at input r at a particular point in each revolution (e.g. at sector 0). The duration of the pulse can be chosen to be one sample time. The magnitude of the pulse can be chosen such that the magnitude of the response at the Position Error Signal (PES) 1306 is approximately the same as the PES magnitude caused by the external disturbances (noise signal d on line 1318). For the system including the pulse at input r, we again measure the average of the actuator current signal u and measured actuator position m for several revolutions. The result is described as:

$$u_b(z) = \frac{1}{n}\sum_{i=1}^{n} \frac{-C(z)d_i(z)+C(z)r(z)}{P(z)C(z)+1} \cup -\frac{C(z)d_r(z)}{P(z)C(z)+1} + \frac{C(z)r(z)}{P(z)C(z)+1}$$

$$m_b(z) = \frac{1}{n}\sum_{i=1}^{n} \frac{d_i(z)+P(z)C(z)r(z)}{P(z)C(z)+1} \cup \frac{d_r(z)}{P(z)C(z)+1} + \frac{P(z)C(z)r(z)}{P(z)C(z)+1}$$

Note that the averaging process has to be synchronized to the disk rotation so that the resulting signal will contain only repeatable components. The perturbing pulse inserted at input r results in the following responses at u and m:

$$u_i(z) = u_b(z) - u_a(z) \cup \frac{C(z)r(z)}{P(z)C(z)+1}$$

$$m_i(z) = m_b(z) - m_a(z) \cup \frac{P(z)C(z)r(z)}{P(z)C(z)+1}$$

Note that the responses to the perturbation, i.e. signals $u_i(z)$ and $m_i(z)$, are not influenced by the noise signal d.

To approximate the Plant Model transfer function, the impulse response of the particular actuator is obtained by deconvolving $u_i(z)$ from $m_i(z)$ where:

$$F(z)=\mathrm{deconv}(m_i(z),u_i(z))$$

The results of the deconvolution may be directly applied as coefficients of a finite impulse response (FIR) filter. The FIR filter can be used as an approximate plant transfer function. However, the transfer function P(z) of the actuator 1304 contains a double integrating term. Accordingly, a high order FIR filter may be required to accurately match the low frequency behavior of actuator 1304. Since the implementation of high order filters is difficult, the following simple procedure can be used to reduce the order of the Plant Model.

The integration of the impulse response F(z) can be removed by differentiating the impulse response twice (406) where, $$F_d(z)=\mathrm{diff}(\mathrm{diff}(F(z)))$$

In order to match the low frequency properties of actuator 1304, the double integrating property of the Plant transfer function has to be preserved in the model. This can be easily accomplished by dividing $F_d(z)$ by $(z-1)^2$, where $F_n(z)$ denotes the first n elements of $F_d(z)$. Thus the Plant model may be described by:

$$\hat{P}(z) = \frac{F_n(z)}{(z-1)^2}$$

This system identification procedure can be performed on each drive to fine tune the coefficients of the actuator model on each individual drive.

Correction of Errors Due to Non-repeatable Disturbances

The procedure in the preceding section provides for the elimination of the repeatable disturbance caused by disk distortion, bearing imperfections, and vibration. As discussed earlier, non-repeatable errors are also present in the storage system. Non-repeatable errors are typically caused by bearing imperfections, actuator and suspension resonances, disk flutter, and disk vibration. A method for correcting for the non-repeatable disturbances will now be described.

When a whole set of drive level ABCD bursts are written on the media, the actuator 1304 is controlled such that the path which the head (not shown) follows coincides with the drive level servo track. Typically, at these positions the magnitude of the A burst is equal to the magnitude of the B burst, or the magnitude of the C burst is equal to that of the D burst.

During the next revolution the measured position information obtained from the drive level bursts and from the rulers is simultaneously collected. The magnitude of the repeatable disturbance on the track defined by the drive level servo bursts at sector k is represented by the variable $d_{rk}$. The variable $d_{nk}$ represents the magnitude of the deviation from the head from the track center due to non-repeatable disturbances. The measured position is determined by the equation $b_k = d_{rk} + d_{nk}$. Since the correction table W cancels ,the repeatable component of the position information, the corrected position information is $f_k = d_{nk}$. The position information is subtracted from the drive level bursts, $z_k = b_k - f_k = d_{rk}$, to provide the drive level ZAP correction factors. During the next revolution the ZAP correction factors are stored on the disk, typically in, the dedicated fields in the servo sectors. During normal operation of the storage system, the ZAP correction factors are read as part of the drive level servo sectors and subtracted from the measured position. Once the drive level ZAP correction, factors are determined and stored on the disk, the head is moved to the next track (move forward $x_r/2$), and the steps shown in blocks 704 through 716 are repeated until all of the tracks have been completed.

Magnetoresistive heads are employed in many hard disk drives. Due to the relative offset of the read and write heads the read head may follow a different path during reading and writing. Therefore, the repeatable disturbance may be different at the read path and at the write path. Thus, a different set of correction factors may have to be determined for reading and writing.

While the invention has been particularly shown and described with reference to a preferred embodiment, it will be understood by those skilled in the art that various changes in form and detail, may be made therein without departing from the spirit and scope of the invention.

What is claimed is:

1. A method for writing at least one concentric track on at least one storage disk, the method comprising:

calibrating at least one ruler on the at least one storage disk, wherein at least one correction factor is detemined for the at least one ruler;

activating a servo system; and writing a final servo pattern and modifying the at least one correction factor to account for variations in any repeatable disturbances and for errors caused by any non-repeatable disturbances.

2. The method of claim 1, further comprising the step of repeating the step of writing a final servo pattern and modifying the at least one correction factor to account for variations in any repeatable disturbances and for errors caused by any non-repeatable disturbances for each track on the at least one storage disk.

3. The method of claim 1, further comprising the steps of forming the at least one ruler to the at least one storage disk, and installing the at least one storage disk on which the at least one ruler is written onto a spindle, said forming and installing steps being performed prior to the respective calibrating, activating and writing steps.

4. A method for writing at least one concentric track on at least one storage disk in a data storage system, the method comprising:

determining at least one correction factor for at least one ruler on the at least one storage disk;

activating a servo system;

writing a final servo pattern and modifying the at least one corrective factor to account for variations in any repeatable disturbances; and determining at least one drive level correction factor to account for errors caused by any non-repeatable disturbances.

5. The method of claim 4, further comprising the step of saving the at least one correction factor in a memory.

6. The method of claim 4, wherein the step of determining at least one correction factor for at least one ruler comprises the step of averaging a measured position information for each ruler by reading positional information for a given ruler for a plurality of disk revolutions.

7. The method of claim 4, wherein the step of determining at least one correction factor for each ruler comprises the step of adding the number of wrap overs (T) to a measured position information, wherein the number of wrap overs accounts for the number of times a recording head travels over a boundary within each ruler as the recording head moves on the disk.

8. The method of claim 7, wherein the step of adding the number of wrap overs to the measured position information comprises the steps of:

dividing each ruler into four quadrants;

setting the number of wrap overs to zero (T=0) when a particular ruler number equals zero (k=0);

if $Q_k$ equals 1 and $Q_{k-1}$ equals four, then incrementing T by one (T=T+1), where K denotes the ruler number and $Q_k$ denotes the quadrant at the kth ruler;

if $Q_k$ equals 4 and $Q_{k-1}$ equals 1, then decrementing T by one (T=T−1); and calculating a correction factor for the particular ruler k by adding T to the measured position information, whereby the variable T denotes the number of wrap-overs from quadrant 4 to 1 minus the number of wrap-overs from quadrant 1 to 4.

9. The method of claim 4, further comprising the steps of forming the at least one ruler to the at least one storage disk, and installing the at least one storage disk on which the at least one ruler is written onto a spindle, said forming and installing steps being performed prior to the respective determining, activating and writing steps.

10. A control system for a data storage system that controls the position of at least one recording head so that the at least one recording head follows at least one concentric track on at least one storage disk, the system comprising:

an actuator coupled to a recording head, wherein the actuator generates a position signal that positions the recording head over a particular location on a storage disk that corresponds to the generated position signal;

a controller coupled to the actuator, wherein an output signal of the controller is input into the actuator and causes the actuator to move to the particular location on the storage disk;

an actuator model coupled to the output of the controller, wherein the actuator model generates an estimated position signal for the recording head; and a correction updater coupled to an output of the actuator model, wherein the correction updater modifies at least one correction factor based on the estimated position signal output from the actuator model and the position signal output from the actuator, wherein the modified correction factor is fed back to the controller to correct for any repeatable and non-repeatable disturbances.

11. A disk storage system, comprising:

a storage disk, wherein the disk has at least one ruler formed thereon; and a correction table stored in a memory, wherein the correction table is comprised of at least one modified correction factor that corrects for any repeatable and non-repeatable disturbances associated with a track on the storage disk.

12. The disk storage system of claim 11, wherein the at least one ruler formed on the storage disk is formed prior to installation of the storage disk into the disk storage system.

13. A method comprising:

forming a ruler on a storage disk while rotating the disk using a first spindle;

determining a correction factor for the ruler while rotating the disk using a second spindle; and writing a final servo pattern and modifying the correction factor to account for variations in any repeatable disturbances and for errors caused by any non-repeatable disturbances while the disk is rotated using the second spindle.

* * * * *